US009872286B2

(12) United States Patent
Tabet et al.

(10) Patent No.: US 9,872,286 B2
(45) Date of Patent: Jan. 16, 2018

(54) COMPRESSED SYSTEM INFORMATION FOR LINK BUDGET LIMITED UES IN A RADIO ACCESS NETWORK

(71) Applicant: Apple Inc., Cupertino, CA (US)

(72) Inventors: Tarik Tabet, Los Gatos, CA (US); Awais M. Hussain, Milpitas, CA (US); Samy Khay-Ibbat, San Francisco, CA (US); Sarma V. Vangala, San Jose, CA (US); Rafael L. Rivera-Barreto, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 74 days.

(21) Appl. No.: 14/865,395

(22) Filed: Sep. 25, 2015

(65) Prior Publication Data

US 2016/0150506 A1  May 26, 2016

Related U.S. Application Data

(60) Provisional application No. 62/083,075, filed on Nov. 21, 2014.

(51) Int. Cl.
  *H04W 72/04* (2009.01)
  *H04W 48/20* (2009.01)
  *H04W 48/12* (2009.01)

(52) U.S. Cl.
  CPC ......... *H04W 72/042* (2013.01); *H04W 48/12* (2013.01); *H04W 48/20* (2013.01)

(58) Field of Classification Search
  CPC .... H04W 72/042; H04W 48/20; H04W 48/12
  (Continued)

(56) References Cited

U.S. PATENT DOCUMENTS 8,724,448 B2  5/2014  Roessel et al.
8,885,560 B2  11/2014  Wallen et al.
(Continued)

FOREIGN PATENT DOCUMENTS

WO  2009076997 A1  6/2009
WO  2011038243 A2  3/2011
(Continued)

OTHER PUBLICATIONS

International Search Report & Written Opinion, Application No. PCT/US2015/054795, dated Jan. 27, 2016, 11 pages.
(Continued)

*Primary Examiner* — Christopher Grey
*Assistant Examiner* — Pamit Kaur
(74) *Attorney, Agent, or Firm* — Meyertons Hood Kivlin Kowert & Goetzel, P.C.; Jeffrey C. Hood; Michael B. Davis

(57) ABSTRACT

Techniques are disclosed relating to broadcasting and receiving system information in a radio access network (RAN). In one embodiment, a base station includes at least one antenna, at least one radio, configured to perform cellular communication using a radio access technology (RAT), and one or more processors coupled to the radio. In this embodiment, the base station is configured to broadcast first system information blocks (SIBs) encoded using a first coding rate and a first identifier. In this embodiment, the base station is also configured to broadcast second SIBs encoded using a second coding rate that is lower than the first coding rate and a second identifier. In this embodiment, the second SIBs include only a portion of the information included in the first SIBs and the second SIBs are usable by user equipment devices (UEs) having a limited link budget to determine access parameters for the base station.

22 Claims, 12 Drawing Sheets

Broadcast first SIBs encoded using a first coding rate and a first identifier
1210

Broadcast second SIBs encoded using a second coding rate that is lower than the first coding rate and a second identifier, where the second SIBs include only a portion of the information included in the first SIBs
1220

(58) Field of Classification Search
USPC .......................................................... 370/329
See application file for complete search history.

(56) References Cited

U.S. PATENT DOCUMENTS

| | | | |
|---|---|---|---|
| 9,078,253 B2 | 7/2015 | Li et al. | |
| 2011/0019615 A1* | 1/2011 | Krco | H04W 48/12 370/328 |
| 2011/0255486 A1* | 10/2011 | Luo | H04W 48/12 370/329 |
| 2013/0064119 A1 | 3/2013 | Montojo et al. | |
| 2014/0044056 A1 | 2/2014 | Chen et al. | |
| 2014/0057634 A1* | 2/2014 | Chang | H04W 36/0083 455/437 |
| 2014/0198685 A1 | 7/2014 | Xu et al. | |
| 2014/0198726 A1 | 7/2014 | Xu et al. | |
| 2014/0293946 A1 | 10/2014 | Suzuki et al. | |
| 2014/0307621 A1 | 10/2014 | Frenger et al. | |
| 2014/0307697 A1 | 10/2014 | Beale | |
| 2014/0334372 A1* | 11/2014 | Vos | H04W 48/10 370/312 |
| 2016/0315752 A1 | 10/2016 | Chen et al. | |
| 2016/0360551 A1 | 12/2016 | Bergman et al. | |
| 2017/0201915 A1 | 7/2017 | Decarreau et al. | |
| 2017/0230876 A1 | 8/2017 | Suzuki et al. | |
| 2017/0230951 A1 | 8/2017 | Xiong et al. | |
| 2017/0244529 A1 | 8/2017 | Yu et al. | |

FOREIGN PATENT DOCUMENTS

| | | | | |
|---|---|---|---|---|
| WO | 2013131262 A1 | 9/2013 | | |
| WO | WO 2013131262 A1 * | 9/2013 | ............ | H04W 48/12 |
| WO | 2013183966 A1 | 12/2013 | | |
| WO | 2015143244 A1 | 9/2015 | | |

OTHER PUBLICATIONS

Fujitsu, "On support of low-cost MTC terminals with reduced Tx/Rx bandwidths", 3GPP TSG-RAN WG1 Meeting #66, Athens, Greece, Aug. 22-26, 2011, 2 pages.

* cited by examiner

FIG. 6A

```
-- ASN1START

SystemInformationBlockType1 ::=     SEQUENCE {
    cellAccessRelatedInfo               SEQUENCE {
        plmn-IdentityList                   PLMN-IdentityList,
        trackingAreaCode                    TrackingAreaCode,
        cellIdentity                        CellIdentity,
        cellBarred                          ENUMERATED {barred, notBarred},
        intraFreqReselection                ENUMERATED {allowed, notAllowed},
        csg-Indication                      BOOLEAN,
        csg-Identity                        CSG-Identity            OPTIONAL    -- Need
OR
    },
    cellSelectionInfo                   SEQUENCE {
        q-RxLevMin                          Q-RxLevMin,
        q-RxLevMinOffset                    INTEGER (1..8)          OPTIONAL    -- Need      } 610
OP
    },
    p-Max                               P-Max                       OPTIONAL,
    -- Need OP
    freqBandIndicator                   FreqBandIndicator,
    schedulingInfoList                  SchedulingInfoList,
    tdd-Config                          TDD-Config                  OPTIONAL,   -- Cond
TDD
    si-WindowLength                     ENUMERATED {
                                            ms1, ms2, ms5, ms10, ms15, ms20,
                                            ms40},
    systemInfoValueTag                  INTEGER (0..31),
    nonCriticalExtension                SystemInformationBlockType1-v890-IEs    OPTIONAL
}

SystemInformationBlockType1-v890-IEs::= SEQUENCE {
    lateNonCriticalExtension            OCTET STRING (CONTAINING
SystemInformationBlockType1-v8h0-IEs)           OPTIONAL,
    nonCriticalExtension                SystemInformationBlockType1-v920-IEs    OPTIONAL
}

-- Late non critical extensions
SystemInformationBlockType1-v8h0-IEs ::=    SEQUENCE {
    multiBandInfoList                   MultiBandInfoList           OPTIONAL,   -- Need OR
    nonCriticalExtension                SystemInformationBlockType1-v9e0-IEs    OPTIONAL
}

SystemInformationBlockType1-v9e0-IEs ::= SEQUENCE {
    freqBandIndicator-v9e0              FreqBandIndicator-v9e0      OPTIONAL,   -- Cond
FBI-max
    multiBandInfoList-v9e0              MultiBandInfoList-v9e0      OPTIONAL,   -- Cond
mFBI-max
    nonCriticalExtension                SEQUENCE {}                 OPTIONAL
}

-- Regular non critical extensions
SystemInformationBlockType1-v920-IEs ::=    SEQUENCE {
    ims-EmergencySupport-r9             ENUMERATED {true}           OPTIONAL,   -- Need
OR
    cellSelectionInfo-v920              CellSelectionInfo-v920      OPTIONAL,   -- Cond   } 620
RSRQ
    nonCriticalExtension                SystemInformationBlockType1-v1130-IEs   OPTIONAL
}

SystemInformationBlockType1-v1130-IEs ::=   SEQUENCE {
    tdd-Config-v1130                    TDD-Config-v1130            OPTIONAL,   -- Cond TDD-
OR
    cellSelectionInfo-v1130             CellSelectionInfo-v1130     OPTIONAL,   -- Cond WB-  } 630
RSRQ
    nonCriticalExtension                SEQUENCE {}                 OPTIONAL
}
```

(continued on FIG. 6B)

Compressed-SIB
Type1 Message
600

*FIG. 6B*

*(continued from FIG. 6A)*

```
PLMN-IdentityList ::=                   SEQUENCE (SIZE (1..maxPLMN-r11)) OF PLMN-
IdentityInfo PLMN-IdentityInfo ::=                   SEQUENCE {
    plmn-Identity                           PLMN-Identity,
    cellReservedForOperatorUse              ENUMERATED {reserved, notReserved}
}

SchedulingInfoList ::= SEQUENCE (SIZE (1..maxSI-Message)) OF SchedulingInfo

SchedulingInfo ::=  SEQUENCE {
    si-Periodicity                      ENUMERATED {
                                            rf8, rf16, rf32, rf64, rf128, rf256, rf512},
    sib-MappingInfo                     SIB-MappingInfo
}

SIB-MappingInfo ::= SEQUENCE (SIZE (0..maxSIB-1)) OF SIB-Type

SIB-Type ::=                            ENUMERATED {
                                            sibType3, sibType4, sibType5, sibType6,
                                            sibType7, sibType8, sibType9, sibType10,
                                            sibType11, sibType12-v920, sibType13-v920,
                                            sibType14-v1130, sibType15-v1130,
                                            sibType16-v1130, spare2, spare1, ...}
```
```
CellSelectionInfo-v920 ::=              SEQUENCE {
    q-QualMin-r9                            Q-QualMin-r9,
    q-QualMinOffset-r9                      INTEGER (1..8)                  OPTIONAL
    -- Need OP
}

CellSelectionInfo-v1130 ::=             SEQUENCE {
    q-QualMinWB-r11                         Q-QualMin-r9
}
```
⎫
⎬ 640
⎭

```
-- ASN1STOP
```

FIG. 7

```
-- ASN1START
SystemInformationBlockType2 ::=    SEQUENCE {
    ac-BarringInfo                     SEQUENCE {
        ac-BarringForEmergency             BOOLEAN,
        ac-BarringForMO-Signalling         AC-BarringConfig        OPTIONAL,
        -- Need OP
        ac-BarringForMO-Data               AC-BarringConfig        OPTIONAL
        -- Need OP
    }                                                              OPTIONAL,      ⎫
    -- Need OP                                                                    ⎬ 710
    radioResourceConfigCommon          RadioResourceConfigCommonSIB,              ⎭
    ue-TimersAndConstants              UE-TimersAndConstants,
    freqInfo                           SEQUENCE {
        ul-CarrierFreq                     ARFCN-ValueEUTRA        OPTIONAL,
        -- Need OP
        ul-Bandwidth                       ENUMERATED {n6, n15, n25, n50, n75, n100}
                                                                   OPTIONAL,
        -- Need OP
        additionalSpectrumEmission         AdditionalSpectrumEmission          ⎤ 720
    },
    mbsfn-SubframeConfigList           MBSFN-SubframeConfigList    OPTIONAL,
    -- Need OR
    timeAlignmentTimerCommon           TimeAlignmentTimer,
    ...,
    lateNonCriticalExtension           OCTET STRING (CONTAINING
SystemInformationBlockType2-v8h0-IEs)                              OPTIONAL,
    [[ ssac-BarringForMMTEL-Voice-r9    AC-BarringConfig           OPTIONAL,    ⎫
    -- Need OP                                                                   ⎪
       ssac-BarringForMMTEL-Video-r9    AC-BarringConfig           OPTIONAL     ⎬ 730
    -- Need OP                                                                   ⎪
    ]],                                                                          ⎪
    [[ ac-BarringForCSFB-r10            AC-BarringConfig           OPTIONAL --  ⎪
Need OP                                                                         ⎭
    ]]
}

SystemInformationBlockType2-v8h0-IEs ::=   SEQUENCE {
    multiBandInfoList                  SEQUENCE (SIZE (1..maxMultiBands)) OF    ⎤ 740
AdditionalSpectrumEmission  OPTIONAL,   -- Need OR
    nonCriticalExtension               SystemInformationBlockType2-v9e0-IEs   OPTIONAL
}

SystemInformationBlockType2-v9e0-IEs ::= SEQUENCE {
    ul-CarrierFreq-v9e0                ARFCN-ValueEUTRA-v9e0       OPTIONAL,   -- Cond
ul-FreqMax
    nonCriticalExtension               SEQUENCE {}                 OPTIONAL
}

AC-BarringConfig ::=                   SEQUENCE {                              ⎫
    ac-BarringFactor                   ENUMERATED {                            ⎪
                                           p00, p05, p10, p15, p20, p25, p30, p40,⎪
                                           p50, p60, p70, p75, p80, p85, p90, p95},⎬ 750
    ac-BarringTime                     ENUMERATED {s4, s8, s16, s32, s64, s128, s256,⎪
s512},                                                                         ⎪
    ac-BarringForSpecialAC             BIT STRING (SIZE(5))                    ⎪
}                                                                              ⎭

MBSFN-SubframeConfigList ::=           SEQUENCE (SIZE (1..maxMBSFN-Allocations)) OF MBSFN-
SubframeConfig

-- ASN1STOP
```

Compressed-SIB Type2 Information 700

FIG. 8

```
-- ASN1START
SystemInformationBlockType3 ::=     SEQUENCE {
    cellReselectionInfoCommon       SEQUENCE {
        q-Hyst                          ENUMERATED {
                                            dB0, dB1, dB2, dB3, dB4, dB5, dB6, dB8,
dB10,
                                            dB12, dB14, dB16, dB18, dB20, dB22,
dB24},
        speedStateReselectionPars       SEQUENCE {
            mobilityStateParameters         MobilityStateParameters,
            q-HystSF                        SEQUENCE {                                  ⎫
                sf-Medium                       ENUMERATED {                            ⎪
                                                    dB-6, dB-4, dB-2, dB0},             ⎪
                sf-High                         ENUMERATED {                            ⎬ 810
                                                    dB-6, dB-4, dB-2, dB0}              ⎪
                                                                                        ⎪
            :                                                           OPTIONAL        ⎪
        -- Need OP                                                                      ⎭
    },
    cellReselectionServingFreqInfo  SEQUENCE {
        s-NonIntraSearch                ReselectionThreshold        OPTIONAL,       ⎫
        -- Need OP                                                                  ⎬ 820
        threshServingLow                ReselectionThreshold,                       ⎪
        cellReselectionPriority         CellReselectionPriority                     ⎭
    },
    intraFreqCellReselectionInfo    SEQUENCE {
        q-RxLevMin                      Q-RxLevMin,                                 ⎫
        p-Max                           P-Max                       OPTIONAL,       ⎪
        -- Need OP                                                                  ⎬ 830
        s-IntraSearch                   ReselectionThreshold        OPTIONAL,       ⎪
        -- Need OP                                                                  ⎭
        allowedMeasBandwidth            AllowedMeasBandwidth        OPTIONAL,
        -- Need OP
        presenceAntennaPort1            PresenceAntennaPort1,
        neighCellConfig                 NeighCellConfig,
        t-ReselectionEUTRA              T-Reselection,                              ⎫
        t-ReselectionEUTRA-SF           SpeedStateScaleFactors      OPTIONAL        ⎪
        -- Need OP                                                                  ⎪
    },                                                                              ⎪
    ...,                                                                            ⎪
    [[ eteNonCriticalExtension         OCTET STRING                 OPTIONAL,       ⎪
    [[ s-IntraSearch-v920              SEQUENCE {                                   ⎪
        s-IntraSearchP-r9                  ReselectionThreshold,                    ⎪
        s-IntraSearchQ-r9                  ReselectionThresholdQ-r9                 ⎪
        :                                                           OPTIONAL,       ⎪
    -- Need OP                                                                      ⎪
    s-NonIntraSearch-v920              SEQUENCE {                                   ⎬ 840
        s-NonIntraSearchP-r9               ReselectionThreshold,                    ⎪
        s-NonIntraSearchQ-r9               ReselectionThresholdQ-r9                 ⎪
        :                                                           OPTIONAL,       ⎪
    -- Need OP                                                                      ⎪
    q-QualMin-r9                       Q-QualMin-r9                OPTIONAL,        ⎪
    -- Need OP                                                                      ⎪
    threshServingLowQ-r9               ReselectionThresholdQ-r9    OPTIONAL         ⎪
    -- Need OP                                                                      ⎪
    ]],                                                                             ⎪
    [[ q-QualMinWB-r11                 Q-QualMin-r9                OPTIONAL     --  ⎪
Cond WB-RSRQ                                                                        ⎪
    ]]                                                                              ⎭
}

-- ASN1STOP
```

Compressed-SIB
Type3 Information
800

FIG. 9

```
-- ASN1START

SystemInformationBlockType4 ::=    SEQUENCE {
    intraFreqNeighCellList             IntraFreqNeighCellList    OPTIONAL,   -- Need
OR
    intraFreqBlackCellList             IntraFreqBlackCellList                OPTIONAL,
    -- Need OR
    csg-PhysCellIdRange                PhysCellIdRange           OPTIONAL,   -- Cond
CSG
    ...,
    lateNonCriticalExtension               OCTET STRING                 OPTIONAL
}

IntraFreqNeighCellList ::=    SEQUENCE (SIZE (1..maxCellIntra)) OF
IntraFreqNeighCellInfo IntraFreqNeighCellInfo ::=    SEQUENCE {
    physCellId                       PhysCellId,
    q-OffsetCell                     Q-OffsetRange,
    ...
}

IntraFreqBlackCellList ::=    SEQUENCE (SIZE (1..maxCellBlack)) OF PhysCellIdRange

-- ASN1STOP
```

⊃ 910

Compressed-SIB
Type4 Information
900

FIG. 10

```
-- ASN1START

SystemInformationBlockType5 ::=    SEQUENCE {
    interFreqCarrierFreqList       InterFreqCarrierFreqList,
    ...,
    lateNonCriticalExtension           OCTET STRING    (CONTAINING
SystemInformationBlockType5-v8h0-IEs)                  OPTIONAL
}

SystemInformationBlockType5-v8h0-IEs ::=    SEQUENCE {
    interFreqCarrierFreqList-v8h0 SEQUENCE (SIZE (1..maxFreq)) OF
InterFreqCarrierFreqInfo-v8h0               OPTIONAL,  -- Need OP
    nonCriticalExtension        SystemInformationBlockType5-v9e0-IEs    OPTIONAL
}

SystemInformationBlockType5-v9e0-IEs ::=    SEQUENCE {
    interFreqCarrierFreqList-v9e0  SEQUENCE (SIZE (1..maxFreq)) OF
InterFreqCarrierFreqInfo-v9e0               OPTIONAL,  -- Need OR
    nonCriticalExtension        SEQUENCE {}                     OPTIONAL
}

InterFreqCarrierFreqList ::=    SEQUENCE (SIZE (1..maxFreq)) OF
InterFreqCarrierFreqInfo InterFreqCarrierFreqInfo ::=   SEQUENCE {
    dl-CarrierFreq                  ARFCN-ValueEUTRA,
    q-RxLevMin                      Q-RxLevMin,
    p-Max                           P-Max                       OPTIONAL,
    -- Need OP
    t-ReselectionEUTRA              T-Reselection,
    t-ReselectionEUTRA-SF           SpeedStateScaleFactors      OPTIONAL,
    -- Need OP
    threshX-High                    ReselectionThreshold,
    threshX-Low                     ReselectionThreshold,
    allowedMeasBandwidth            AllowedMeasBandwidth,
    presenceAntennaPort1            PresenceAntennaPort1,
    cellReselectionPriority         CellReselectionPriority     OPTIONAL,
    -- Need OP
    neighCellConfig                 NeighCellConfig,
    q-OffsetFreq                    Q-OffsetRange               DEFAULT dB0,
    interFreqNeighCellList          InterFreqNeighCellList      OPTIONAL,
    -- Need OR
    interFreqBlackCellList          InterFreqBlackCellList      OPTIONAL,
    -- Need OR
    ...,
    [[ q-QualMin-r9                 Q-QualMin-r9                OPTIONAL,
       -- Need OP
       threshX-Q-r9                 SEQUENCE {
           threshX-HighQ-r9             ReselectionThresholdQ-r9,
           threshX-LowQ-r9              ReselectionThresholdQ-r9
       }                                                        OPTIONAL
       -- Cond RSRQ
    ]],
    [[ q-QualMinWB-r11              Q-QualMin-r9                OPTIONAL    --
Cond WB-RSRQ
    ]]
}
InterFreqCarrierFreqInfo-v8h0 ::=    SEQUENCE {
    multiBandInfoList               MultiBandInfoList           OPTIONAL    --
Need OR
}

InterFreqCarrierFreqInfo-v9e0 ::=    SEQUENCE {
    dl-CarrierFreq-v9e0             ARFCN-ValueEUTRA-v9e0   OPTIONAL,   -- Cond dl-
FreqMax
    multiBandInfoList-v9e0          MultiBandInfoList-v9e0  OPTIONAL    -- Need OR
}
InterFreqNeighCellList ::=    SEQUENCE (SIZE (1..maxCellInter)) OF
InterFreqNeighCellInfo InterFreqNeighCellInfo ::=   SEQUENCE {
    physCellId                      PhysCellId,
    q-OffsetCell                    Q-OffsetRange
}
InterFreqBlackCellList ::=    SEQUENCE (SIZE (1..maxCellBlack)) OF PhysCellIdRange
```

```
-- ASN1START

SystemInformationBlockType14-r11 ::=    SEQUENCE {
    eab-Param-r11                           CHOICE {
        eab-Common-r11                          EAB-Config-r11,
        eab-PerPLMN-List-r11                    SEQUENCE (SIZE (1..maxPLMN-r11)) OF EAB-
ConfigPLMN-r11
    }                                       OPTIONAL, -- Need OR ac-BarringInfo                          SEQUENCE {
        ac-BarringForEmergency                  BOOLEAN,
        ac-Barring                              AC-BarringConfig              OPTIONAL,
    -- Need OP
    }                                                                         OPTIONAL,
    -- Need OP lateNonCriticalExtension                OCTET STRING                  OPTIONAL,
    ...
}

EAB-ConfigPLMN-r11 ::=                  SEQUENCE {
    eab-Config-r11                          EAB-Config-r11                OPTIONAL -- Need OR
}

EAB-Config-r11 ::=                      SEQUENCE {
    eab-Category-r11                        ENUMERATED {a, b, c},
    eab-BarringBitmap-r11                   BIT STRING (SIZE (10))
}
```
```
AC-BarringConfig ::=                    SEQUENCE {                                              ⎫
    ac-BarringFactor                        ENUMERATED {                                        ⎪
                                                p00, p05, p10, p15, p20, p25, p30, p40,         ⎬ 1110
                                                p50, p60, p70, p75, p80, p85, p90, p95},        ⎪
    ac-BarringTime                          ENUMERATED {s4, s8, s16, s32, s64, s128, s256,      ⎪
s512}                                                                                           ⎭
}
```
```
-- ASN1STOP
```

*Compressed-SIB*
*type14 Information*
<u>1100</u>

US 9,872,286 B2

COMPRESSED SYSTEM INFORMATION FOR LINK BUDGET LIMITED UES IN A RADIO ACCESS NETWORK

PRIORITY CLAIM

This application claims the benefit of U.S. Provisional Application No. 62/083,075, filed on Nov. 21, 2014, which is incorporated by reference herein in its entirety.

FIELD OF THE INVENTION

The present application relates to wireless cellular devices, and more particularly to techniques for broadcasting and receiving system information.

DESCRIPTION OF THE RELATED ART

Wireless communication systems are rapidly growing in usage. Further, wireless communication technology has evolved from voice-only communications to also include the transmission of data, such as Internet and multimedia content.

Wireless base stations typically broadcast system information (SI) in messages that are repeated periodically. UEs may use acquired SI for cell selection, cell reselection, and before initiating communication with a given base station. Each SI message includes one or more system information blocks (SIBs). For example, in some LTE networks, an eNB broadcasts a master information block (MIB) on the physical broadcast channel (PBCH) and other SIBs on the physical download shared channel (PDSCH) through radio resource control (RRC) messages. Examples of system information included in the SIBs include: random access channel (RACH) configuration, uplink frequency and bandwidth, paging configuration, cell selection/reselection information, neighbor cell information, etc.

Some UEs with limited link budgets may not be able to reliably decode SI messages when they are broadcast at typical coding-rates and transport block (TB) sizes used by a base station. For example, bundling of multiple SIBs on a given SI window may lead to large TB sizes that are difficult to decode.

The "link budget" of a UE refers to an accounting of gains and losses from a transmitter, through the communications medium, and to a receiver. The link budget may be based on communication configuration (e.g., sub-channel and sub-frame spacing and bandwidth, number of antennas used, modulation type, etc.), transmitter parameters (e.g., power, antenna gain, filter/cable loss, etc.), receiver parameters (noise, antenna gain, filter/cable loss, etc.) and other parameters (e.g., handoff gain, HARQ gain, coding gain, penetration loss, etc.).

Therefore, improvements are desired in wireless communication in the context of UEs with limited link budgets.

SUMMARY OF THE INVENTION

Embodiments described herein may relate to broadcasting and receiving system information in a radio access network (RAN).

In some embodiments, a base station includes at least one antenna, at least one radio, configured to perform cellular communication using a radio access technology (RAT), and one or more processors coupled to the radio. In these embodiments, the base station is configured to broadcast first system information blocks (SIBs) encoded using a first coding rate and a first identifier. In these embodiments, the base station is also configured to broadcast second SIBs encoded using a second coding rate that is lower than the first coding rate and a second identifier. In these embodiments, the second SIBs include only a portion of the information included in the first SIBs and the second SIBs are usable by a class of user equipment devices (UEs) having a limited link budget to determine access parameters for the base station.

In some embodiments, a user equipment device (UE) includes at least one antenna, at least one radio configured to perform cellular communication using a radio access technology (RAT), and one or more processors coupled to the radio. In these embodiments, the one or more processors and the radio are configured to perform voice and/or data communications. In these embodiments, the UE is configured to receive compressed system information blocks (SIBs) in a broadcast transmission from a base station. In this embodiment, the base station is configured to broadcast transmissions with both compressed SIBs and non-compressed SIBs. In these embodiments, the UE is configured to decode the compressed SIBs from the broadcast transmission and initiate communication with the base station based on access parameters specified by the decoded compressed system information.

In some embodiments, an apparatus includes one or more processing elements configured to decode compressed SIBs from a broadcast transmission from a base station, wherein the base station is configured to broadcast transmissions with both compressed SIBs and non-compressed SIBs. In some embodiments, the one or more processing elements are configured to initiate communication with the base station based on access parameters specified by the decoded compressed system information. The apparatus may consist of the one or more processing elements and/or may be an integrated circuit.

In some embodiments, a method includes a base station broadcasting first system information blocks (SIBs) encoded using a first coding rate and a first identifier broadcasting second SIBs encoded using a second coding rate that is lower than the first coding rate and a second identifier. In these embodiments, the second SIBs include only a portion of the information included in the first SIBs and the second SIBs are usable by a class of user equipment devices (UEs) having a limited link budget to determine access parameters for the base station.

In some embodiments, a method includes a user equipment device (UE) receiving compressed system information blocks (SIBs) in a broadcast transmission from a base station, decoding the compressed SIBs from the broadcast transmission, and initiating communication with the base station based on access parameters specified by the decoded compressed system information.

BRIEF DESCRIPTION OF THE DRAWINGS

A better understanding of the present disclosure can be obtained when the following detailed description of the embodiments is considered in conjunction with the following drawings.

FIGS. 6A-11 illustrate exemplary information included in compressed SIBs, according to some embodiments.

Figure 1:
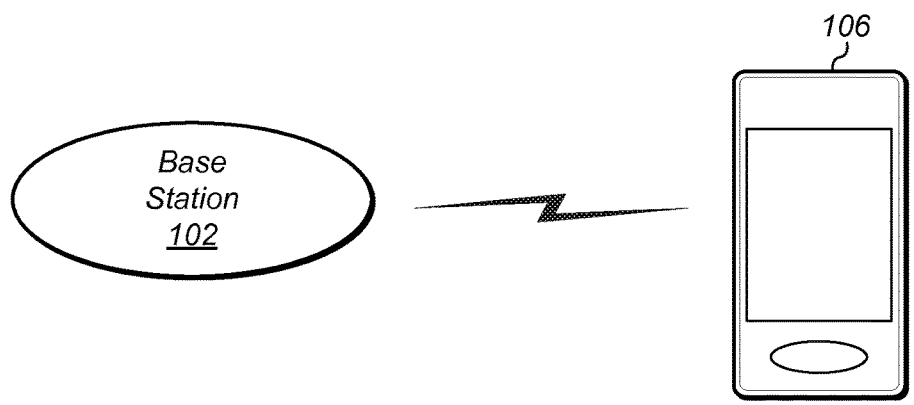
FIG. 1 illustrates an exemplary wireless communication system, according to some embodiments.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF THE EMBODIMENTS

Figure 12:
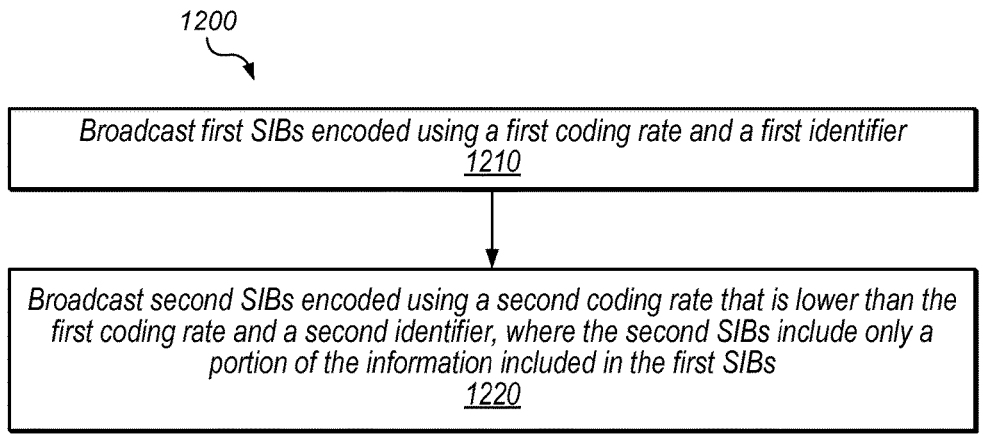
FIG. 12 illustrates an exemplary method for broadcasting compressed SIBs, according to some embodiments.
Figure 13:
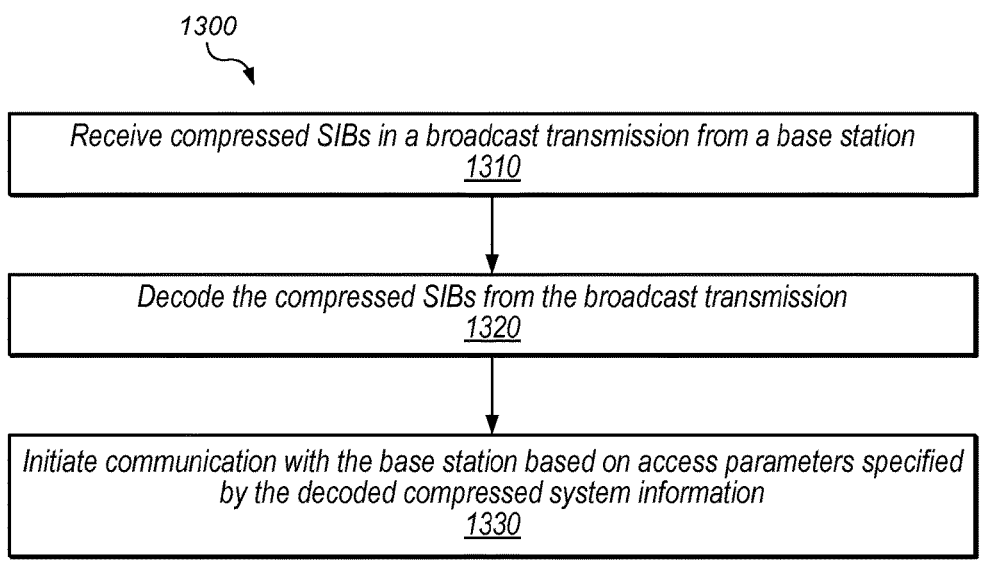
FIG. 13 illustrates an exemplary method for receiving compressed SIBs, according to some embodiments.

This disclosure initially describes, with reference to FIGS. 1-5, an overview of exemplary embodiments of a radio access network, UE device, and base station. FIGS. 6A-11 show exemplary information included in compressed SIBs, which may be broadcast for a class of UE devices having limited link budgets. FIGS. 12-13 illustrate exemplary embodiments of methods for broadcasting/receiving compressed SIBs. In some embodiments, the compressed system information may allow lower coding rates and/or smaller transport blocks for link budget limited devices relative to system information for other devices. In some embodiments, the disclosed techniques may facilitate decoding of system information by UE devices with limited link budgets.

Acronyms

The following acronyms may be used in the present Provisional Patent Application:
3GPP: Third Generation Partnership Project
3GPP2: Third Generation Partnership Project 2
APN: Access Point Name
BLER: Block Error Rate (same as Packet Error Rate)
BER: Bit Error Rate
CRC: Cyclic Redundancy Check
DL: Downlink
GBR: Guaranteed Bit Rate
GSM: Global System for Mobile Communications
IMS: IP Multimedia Subsystem
IP: Internet Protocol
LTE: Long Term Evolution
MIB: Master Information Block
MME: Mobility Management Entity
MO: Message Originating
MT: Message Terminating
NAS: Non-access Stratum
PCC: Policy and Charging Control
PCEF: Policy and Charging Enforcement Function
PCRF: Policy and Charging Rules Function
PCSCF: Proxy Call Session Control Function
PDSCH: Physical Downlink Shared Channel
PDCCH: Physical Downlink Control Channel
PER: Packet Error Rate
PGW: Packet Gateway
PUSCH: Physical Uplink Shared Channel
QCI: Quality of Service Class Index
QoS: Quality of Service
RACH: Random Access Procedure
RNTI: Radio Network Temporary Identifier
RRC: Radio Resource Control
SGW: Serving Gateway
SINR: Signal to Interference-and-Noise Ratio
SIR: Signal to Interference Ratio
SNR: Signal to Noise Ratio
TB: Transport Block
Tx: Transmission
SI: System Information
SIB: System Information Block
UE: User Equipment
UL: Uplink
UMTS: Universal Mobile Telecommunication System
VoLTE: Voice Over LTE

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, wearable device, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which perform wireless communications. Examples of UE devices include mobile telephones or smart phones (e.g., iPhone™, Android™-based phones), wearable devices (e.g., smart watch, smart glasses), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
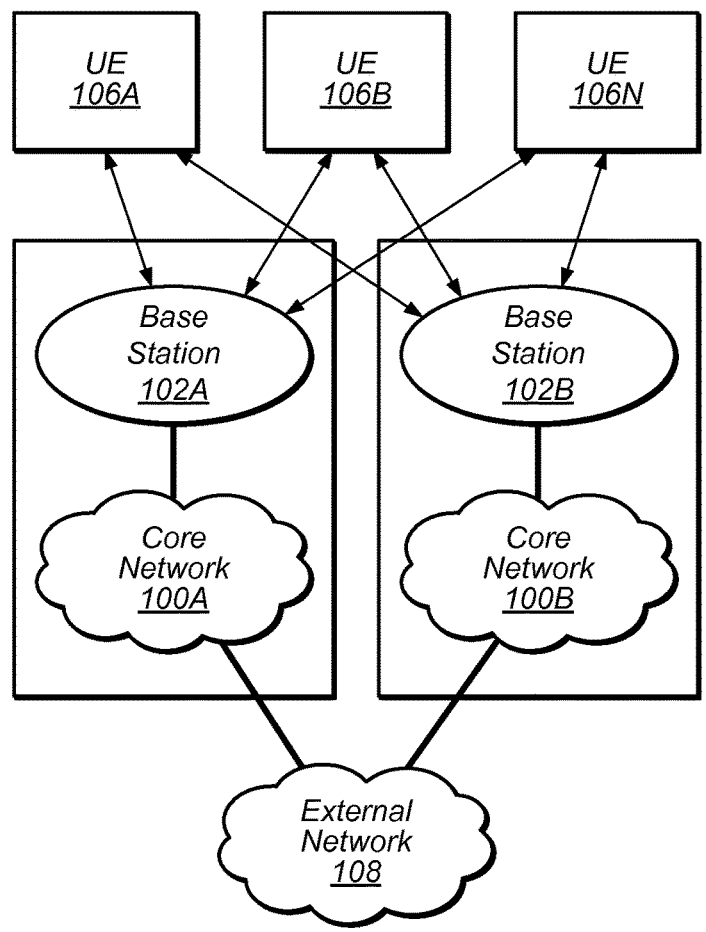
FIG. 2 illustrates a base station in communication with a user equipment device, according to some embodiments.
Figure 3:
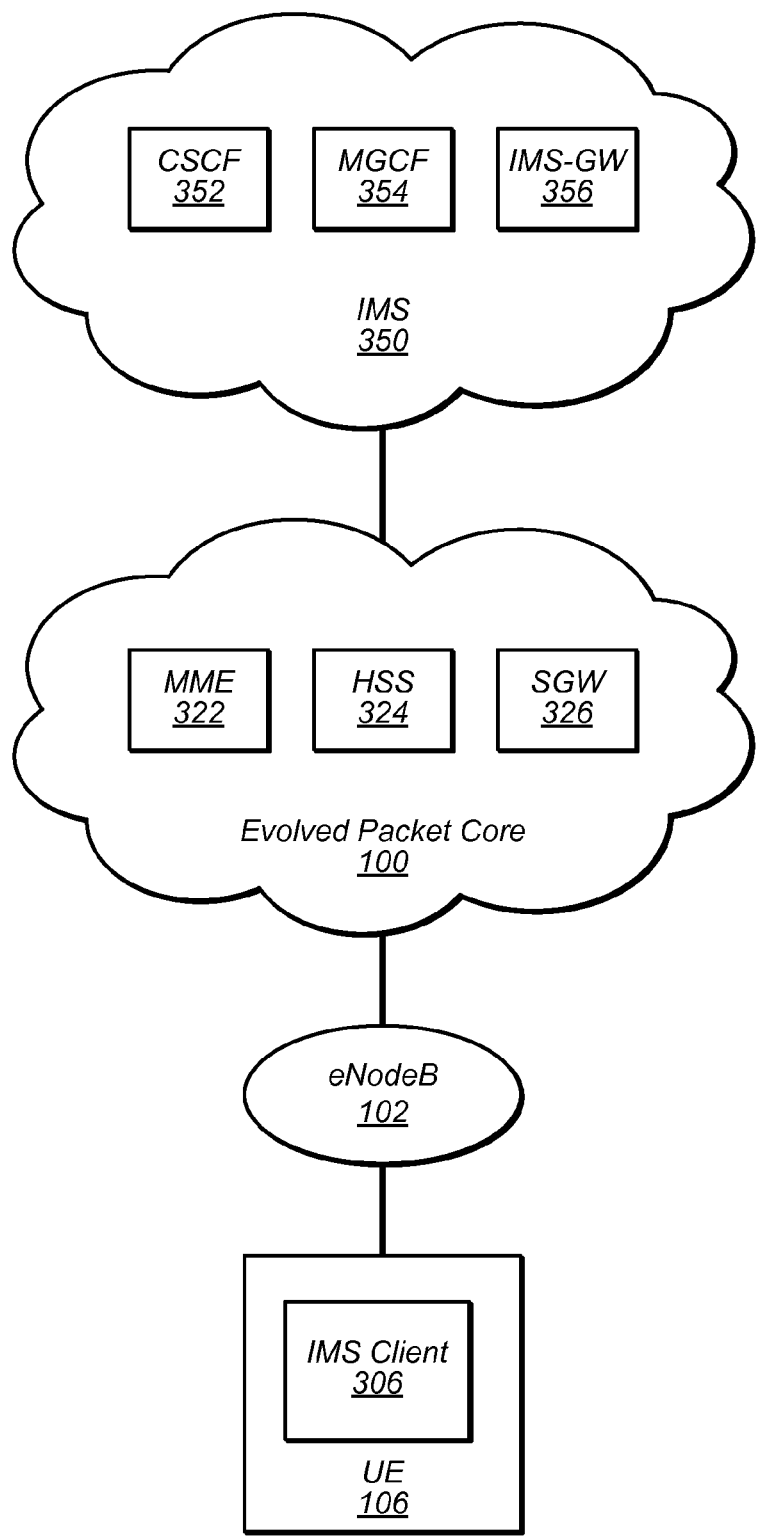
FIG. 3 illustrates a user equipment device in communication with a network via a base station, according to some embodiments.

FIGS. 1-3—Communication System

FIG. 1 illustrates a simplified communication system where a user equipment (UE) 106 is in communication with a base station 102. The UE 106 may be a device with wireless network connectivity such as a mobile phone, a hand-held device, a computer or a tablet, or virtually any type of wireless device. FIG. 2 illustrates an expanded wireless communication system involving multiple UEs 106A-N, base stations 102A and 102B, core networks 100A and 100B, and an external network 108. However, it should be noted that the system of FIG. 2 is merely one example of a possible system, and embodiments may be implemented in any of various systems, as desired.

The base stations 102 may be base transceiver stations (BTS) and/or cell sites, and may include hardware that enables wireless communication with the UEs 106. As shown in FIG. 2, each base station 102 may also be equipped to communicate with a core network 100 (e.g., base station 102A may be coupled to core network 100A, while base station 102B may be coupled to core network 100B), which may be a core network of a cellular service provider. Each core network 100 may also be coupled to one or more external networks (such as external network 108), which may include the Internet, a Public Switched Telephone Network (PSTN), and/or any other network, as desired. Thus, the base stations 102 may facilitate communication between the user devices 106 and/or between the user devices 106 and the networks 100A, 100B, and 108.

The base stations 102 and the user devices 106 may be configured to communicate over the transmission medium using any of various radio access technologies ("RATs", also referred to as wireless communication technologies) or telecommunication standards such as GSM, UMTS (WCDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), etc.

Base station 102A and core network 100A may operate according to a first RAT (e.g., LTE) while base station 102B and core network 100B operate according to a second (e.g., different) RAT (e.g., CDMA 2000 or GSM, among other possibilities). The two networks may be controlled by the same network operator (e.g., cellular service provider or "carrier"), or by different network operators, as desired. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the exemplary network configuration shown in FIG. 2, other network configurations implementing multiple cellular communication technologies are also possible. As one example, base stations 102A and 102B might operate according to different cellular communication technologies but couple to the same core network. As another example, multi-mode base stations capable of simultaneously supporting different cellular communication technologies (e.g., LTE and CDMA2000 1×RTT, LTE and GSM, and/or any other combination of cellular communication technologies) might be coupled to a core network that also supports the different cellular communication technologies.

The UE 106 may include a processor that is configured to execute program instructions stored in memory. The UE 106 may perform any of the method embodiments described herein by executing such stored instructions. The UE 106 may also or alternatively include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple wireless communication standards (e.g., 3GPP, 3GPP2, etc.) or multiple RATs. For example, the UE 106 may be configured to communicate using two or more of GSM, CDMA2000, LTE, LTE-A, HSPA, WLAN, or GNSS, among other possibilities. In one embodiment, a UE 106 may be configured to use a first RAT that is a packet-switched technology (e.g., LTE) and a second RAT that is a circuit-switched technology (e.g., GSM or 1×RTT) while communicating with the base stations 102. Other combinations of RATs are also possible. The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc.

The UE 106 may include one or more antennas for communicating using the RAT(s). In one embodiment, the UE 106 may share one or more parts of a receive and/or transmit chain between multiple RATs; for example, the UE 106 might be configured to communicate using either of CDMA2000 (1×RTT/1×EV-DO/HRPD/eHRPD) or LTE and/or GSM or LTE, e.g., using a single shared radio. The shared radio may include a single antenna, or may include multiple antennas (e.g., for MIMO) for performing wireless communications. Alternatively, the UE 106 may include separate transmit and/or receive chains (e.g., including separate antennas and other radio components) for each RAT with which it is configured to communicate. As a further possibility, the UE 106 may include one or more radios which are shared between multiple RATs, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

FIG. 3 illustrates an exemplary, simplified portion of a wireless communication system that may be particularly useful for implementing voice or video over IP communication, such as voice over LTE (VoLTE) in an LTE network. As shown, the UE 106 may include an IP multimedia subsystem (IMS) client 306, e.g., which may be implemented in various manners, using hardware and/or software. For example, in one embodiment, software and/or hardware may implement an IMS stack that may provide desired IMS functionalities, e.g., including registration, AKA authentication with IPSec support, session setup and resource reservations, etc.

The UE 106 may be in communication with a base station, shown in this exemplary embodiment as an eNodeB 102. In turn, the eNodeB may be coupled to a core network, shown in this exemplary embodiment as an evolved packet core (EPC) 100. As shown, the EPC 100 may include mobility management entity (MME) 322, home subscriber server (HSS) 324, and serving gateway (SGW) 326. The EPC 100 may include various other devices known to those skilled in the art as well.

The EPC 100 may be in communication with the IMS 350. The IMS 350 may include call session control function (CSCF) 352, which may itself include a proxy CSCF (P-CSCF), interrogating CSCF (I-CSCF), and serving CSCF (S-CSCF), as desired. The IMS 350 may also include media gateway controller function (MGCF) 354 and IMS management gateway (IMS-MGW) 356. Similar to the EPC 100, the IMS 350 may include various other devices known to those skilled in the art as well.

Thus, the system of FIG. 3 illustrates an exemplary portion of the data pathway that may be used for voice or video over IP communication, e.g., VoLTE.

Figure 4:
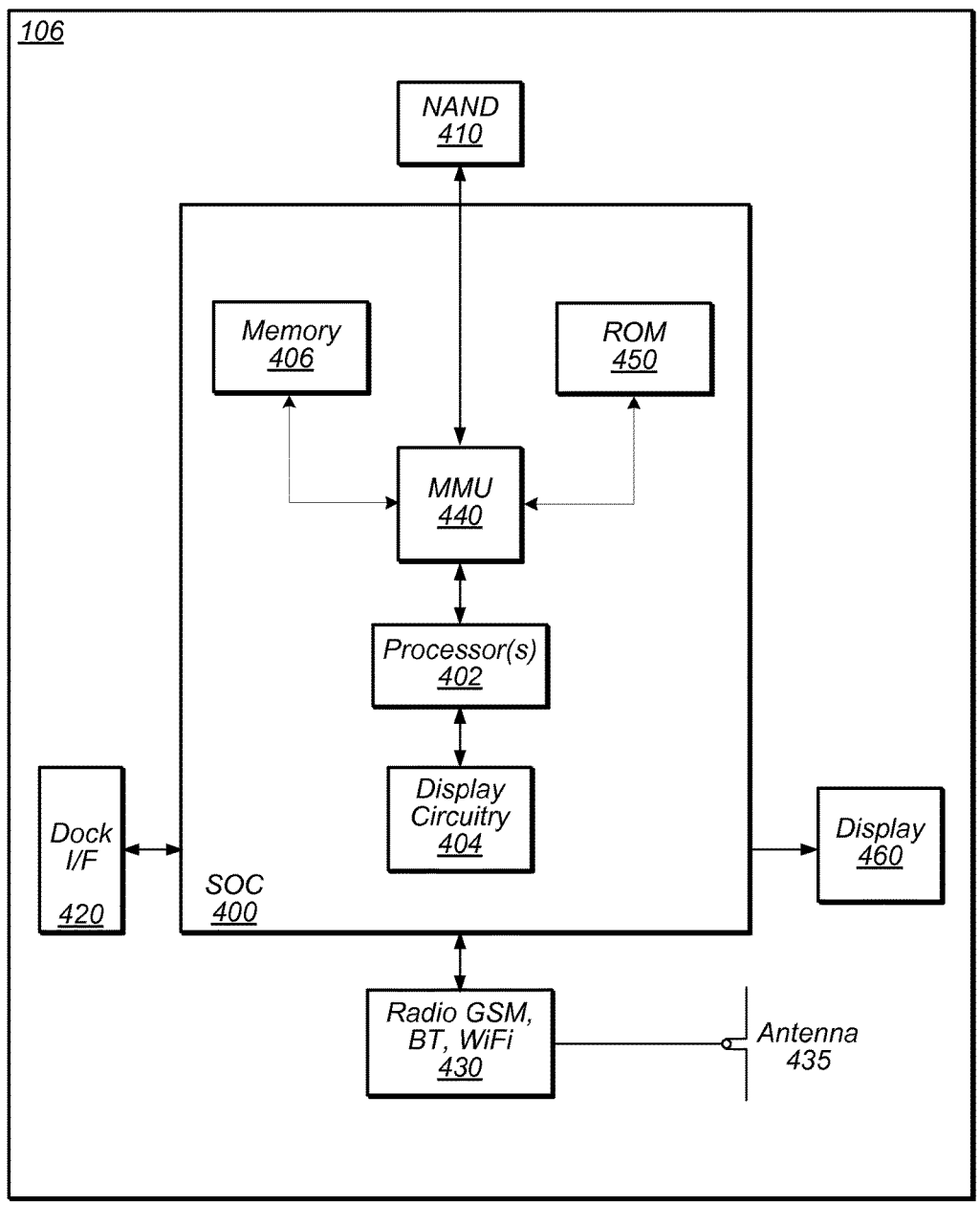
FIG. 4 is an example block diagram of a user equipment device, according to some embodiments.

FIG. 4—Exemplary Block Diagram of a UE

FIG. 4 illustrates an exemplary block diagram of a UE 106. In some embodiment, UE 106 is a device that has a limited link budget. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430 (also referred to as a "radio"), connector I/F 420, and/or display 460. The MMU 440 may be configured to perform memory protection and page table translation or set up. In some embodiments, the MMU 440 may be included as a portion of the processor(s) 402.

As also shown, the SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, and wireless communication circuitry 430 (e.g., for LTE, CDMA2000, Bluetooth, WiFi, etc.).

As noted above, the UE 106 may be configured to communicate wirelessly using multiple wireless communication technologies. As further noted above, in such instances, the wireless communication circuitry (radio(s)) 430 may include radio components which are shared between multiple wireless communication technologies and/or or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna 435 to perform the wireless communication.

As described herein, the UE 106 may include hardware and software components for implementing features for communicating using one or more wireless communication technologies, such as those described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
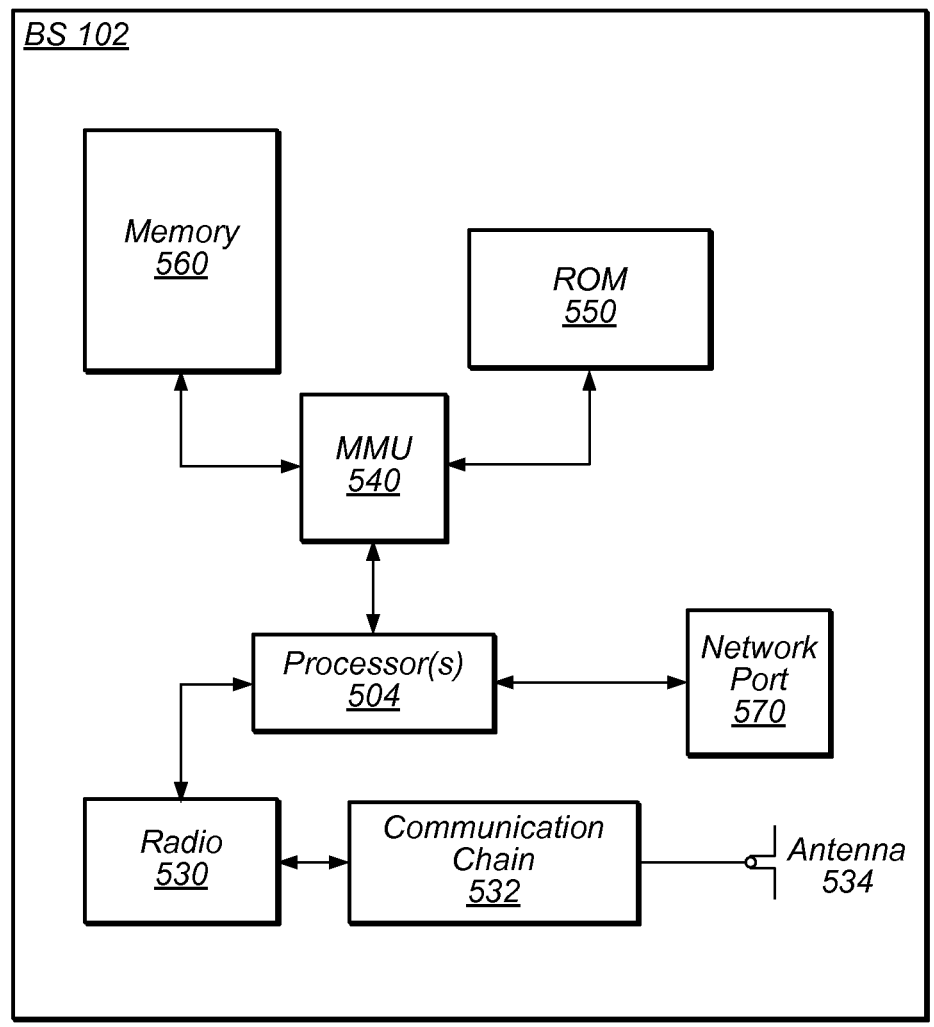
FIG. 5 is an example block diagram of a base station, according to some embodiments.

FIG. 5—Base Station

FIG. 5 illustrates an exemplary block diagram of a base station 102. In some embodiments, base station 102 is configured to broadcast compressed SIBs usable by UE devices having limited link budgets. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106 (see FIG. 3), access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various wireless communication technologies, including, but not limited to, LTE, GSM, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Overview of Compressed System Information

In one embodiment, UE 106 is a member of a class of UEs having limited link budgets. The limits may be based on the physical configuration of UE 106, for example. In some embodiments, limited antenna gain of UE 106 may reduce link budget, for example, based on antenna size or configuration. In some embodiments, UE 106 may include simplified receivers, which may reduce costs but may also reduce link budget. Further, UE 106 may be a lower-power device, which may be advantageous for various reasons but may also reduce link budget. In some embodiments, the status of UE 106 may change from a limited link budget to a greater link budget, e.g., based on a change in battery level or location of the UE, for example. In other embodiments, UE 106 is always link budget limited, e.g., based on the design of UE 106.

In some embodiments, UE 106 is a link budget limited UE configured to make decision about threshold levels (e.g., for cell selection/reselection) without receiving information indicating the threshold levels from base station 102. In other embodiments, UE 106 may be configured with various types of information (e.g., as specified by a dedicated server and/or stored as fixed constants, in some embodiments) rather than receiving the information in SIBs from base station 102.

Therefore, in some embodiments, the amount of system information needed by the class of UEs is reduced. Based on their limited link budgets, these UEs may have difficulty decoding traditional system information. Therefore, in some embodiments, base station 102 is configured to broadcast compressed system information for the class of link budget limited UEs. In some embodiments, base station 102 is configured to broadcast two types of system information: one type for the class of link budget limited UEs and another type for other UEs. In various embodiments, base station 102 is configured to transmit compressed SIBs at a lower coding rate and/or using smaller transport block sizes than non-compressed SIBs.

The "coding rate" of a signal refers to a ratio between transport block size and the number of physical layer bits per subframe that are available for transmission of the transport block. A lower coding rate typically means that more redundancy bits are inserted during channel coding. In some LTE embodiments, coding rate is determined as (transport block size+CRC bits)/(resource elements assigned to PDSCH/PUSCH*bits per resource element). Thus, smaller transport blocks typically correspond to a lower coding rate, assuming other variables (e.g., number of resource elements and bits per resource element) remain constant.

In some LTE embodiments, system information is transmitted using different messages that include at least SIB type 1 (SIB1) messages and SI messages that can include one or more other SIBs (types 2-17). In these embodiments, the SIB1 message may be broadcast in subframe 5 with a periodicity of 80 ms. SIB1 may be repeated when the system frame number (SFN) modulus 2=0. In this embodiment, a new SIB1 is sent every 80 ms while, within the 80 ms period, the same SIB1 is repeated every 20 ms. SIB1 may define the periodicities of the other SIBs. For example, the periodicities of other SIBs may be set to 8, 16, 32, 64, 128, 256, or 512 radio frames in one embodiment. In some embodiments, one or more of the other SIBs may be grouped into a set of SI messages, e.g., for SIBs with similar schedules. The length of the SI windows for SI messages may be set to 1, 2, 5, 10, 20, or 40 ms, in some embodiments. Within an SI window, only one SI message may be sent, but it may be repeated multiple times. Thus, to acquire an SI message, a UE may be configured to monitor from the starting point of an SI window until the SI message is received.

In LTE embodiments that implement compressed SI, the compressed system information may be periodically broadcast on broadcast control channels (BCCH). In some embodiments, the compressed SI is divided into compressed SIBs, similarly to traditional SIBs. In these embodiments, a transport block may include one or more compressed SIBs. The size of the transport blocks may be reduced, given the reduced amount of data present in compressed SIBs. In some embodiments, base station 102 indicates that a transmission includes compressed SIBs using a dedicated radio network temporary identifier (RNTI) which may be referred to as a compressed SI-RNTI (non-compressed SI broadcasts may be indicated using a different SI-RNTI). In some embodiments, the compressed SI-RNTI is selected from among reserved RNTIs (e.g., 0xFFF4-0xFFFC in some embodiments). In these embodiments, compressed SIB 1 may be periodically transmitted on a fixed schedule, similarly to traditional SIB1, and compressed SIB1 may indicate scheduling of other compressed SIBs. Like traditional SIBs, compressed SIBs with similar scheduling may be combined in a compressed SI message.

The coding rate and TB size for compressed SI messages may be determined in order to allow decoding by a class of UEs based on their limited link budget. In some embodiments, base station 102 is configured to transmit compressed SIBs using smaller TBs and/or a lower coding rate relative to non-compressed SIBs. In some embodiments, a UE device may monitor for the compressed SI-RNTI on PDCCH when expecting a broadcast within a specified compressed SI message window or based on a chosen periodicity on a fixed subframe. The compressed SI-RNTI may be used to flag PDSCH transmissions that include compressed SI messages (which in turn include one or more compressed SIBs). In some embodiments, UEs having limited link budgets are configured not to monitor for the legacy SI-RNTI, i.e. not configured to decode legacy SIBs.

In some embodiments, the compressed SI-RNTI may be used to send various types of proprietary configuration information to a UE. As one non-limiting example, SIB2 traditionally includes information about physical RACH configuration. However, an eNB and UE may agree on using a different RACH configuration for a particular set of devices and the eNB may use the compressed SI-RNTI to send that configuration. Similar techniques may be used for various information included in SIBs. Thus, formats different than those specified by a telecommunications standard such as LTE may be implemented in various embodiments.

Exemplary Compressed SIBs

FIGS. 6A-6B show one embodiment of a compressed SIB1 message that has been modified from a traditional SIB1 while FIGS. 7-11 show embodiments of information elements (IEs) for compressed SIBs that have been modified from traditional SIBs set out in the 3GPP TS 36.331 V12.3.0 standard. These compressed SIBs (other than compressed SIB1) may be included in a compressed SI message. The information is specified using abstract syntax notation (ASN). As shown, information in dashed boxes in FIGS. 6A-10 is included in traditional SIBs as specified by 3GPP TS 36.331 V12.3.0 but is not included in the compressed SIBs while information in the solid box in FIG. 11 has been added to the compressed SIBs. In some embodiments, an eNB is configured to broadcast both compressed SIBs and traditional SIBs. The base station may transmit both compressed SI and non-compressed SI at the same time, in parallel. For example, in a given 80 ms period for a non-compressed SIB1, base station 102 may also transmit one or more compressed SIB1's, which may indicate scheduling for other compressed SIBs. Embodiments of traditional SIBs are specified in 3GPP TS 36.331 V12.3.0 (2014-09) at 6.2.2 and 6.3.1, for example.

FIGS. 6A-6B show information for one embodiment of a compressed SIB1 message 600. (The information begins on FIG. 6A and continues on FIG. 6B). In the illustrated embodiment, certain cell selection threshold values in information 610, 620, 630, and 640 have been removed and maximum uplink power information (p-Max) has been removed from information 610. Therefore, a compressed SIB1 message includes less data than a traditional SIB1 message.

FIG. 7 shows information elements 700 for one embodiment of a compressed SIB type 2. In the illustrated embodiment, access class (ac)-barring-info has been removed from information 710, 730, and 750. In some embodiments at least a portion of this information is moved to SIB type 14, as shown in FIG. 11. This may reduce the size of SIB2 while still communicating sufficient information for the class of link budget limited UEs. In the illustrated embodiment, additionalSpectrumEmission fields have been removed (information 720 and 740). In some embodiments, radioResourceConfigCommon for secondary cells will not be present as at most one carrier is supported for the class of UEs. As shown, a compressed SIB2 includes only a portion of the data included in a traditional SIB2.

FIG. 8 shows information elements 800 for one embodiment of a compressed SIB type 3. In the illustrated embodiment, thresholds for cell reselection have been removed from information 810, 820, 830, and 840. In the illustrated embodiment, speed parameters have been removed (information 810 and 840). In the illustrated embodiment, certain priority, bandwidth, neighbor cell information, and two-cell-antenna information has been retained. As shown, a compressed SIB3 includes only a portion of the data included in a traditional SIB3.

FIG. 9 shows information elements 900 for one embodiment of a compressed SIB type 4. In the illustrated embodiment, offset information 910 related to selection thresholds has been removed. As shown, a compressed SIB4 includes only a portion of the data included in a traditional SIB4.

FIG. 10 shows information elements 1000 for one embodiment of a compressed SIB type 10. In the illustrated embodiment, information related to cell selection thresholds, speed, and maximum uplink power has been removed from information 1010, 1020, 1030, 1040, and/or 1050. As shown, a compressed SIB10 includes only a portion of the data included in a traditional SIB 10.

FIG. 11 shows information elements 1100 for one embodiment of a compressed SIB type 14. In the illustrated embodiment, information 1110 related to access-class-barring has been added to SIB type 14. In one embodiment, this information is moved from SIB type 2 to SIB type 14 for compressed SI messages.

In some embodiments, compressed SIBs for SIB types 6-8, 13, and 15 are not implemented and these SIB types are simply dropped (i.e., not broadcast) for the link budget limited class of UEs. In some embodiments, SIB types 10-12 and 16 are unchanged for the link budget limited class of UEs. Therefore, compressed SI messages may include traditional SIB types 10-12 and 16.

Thus, in one embodiment, the following compressed SIBs may be utilized (the information listed for each is exemplary and intended to summarize the purpose of each SIB but is not intended to limit the utility or type of information corresponding to a given SIB):

SIB 1: cell access and SIB scheduling
SIB 2: resource configuration
SIB 3: cell re-selection info
SIB 4: intra-frequency cell re-selection
SIB 5: inter-frequency cell re-selection
SIB 9: home node B (FINE) names (for manual selection)
SIB 10: earthquake and tsunami warning system (ETWS) primary notification
SIB 11: ETWS secondary notification
SIB 12: commercial mobile alert system (CMAS) notification
SIB 14: access class barring info
SIB 16: global positioning system (GPS) and coordinated universal time (UTC) info The compressed SIBs represented by FIGS. 6A-11 are not intended to limit the scope of the present disclosure. In some embodiments, greater or lesser amounts of information may be removed from traditional SIBs for compressed SIBs. In other embodiments, various other types of information and/or organization may be used for compressed SIBs, including system information for non-LTE embodiments. LTE-specific embodiments have been described for illustrative purposes, but are not intended to limit the scope of the present disclosure.

Exemplary Methods

FIG. 12 is a flow diagram illustrating one embodiment of a method 1200 for broadcasting compressed SIBs. The method shown in FIG. 12 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 1210.

At 1210, base station 102 broadcasts first SIBs encoded using a first coding rate and a first identifier. Base station 102 may broadcast the first SIBs using transport blocks having a first size. In some embodiments, the first SIBs are traditional SIBs, e.g., as specified by 3GPP TS 36.331 V12.3.0. In some embodiments, the first identifier is a SI-RNTI.

At 1220, base station 102 broadcasts second SIBs encoded using a second coding rate and a second identifier. In this embodiment, the second coding rate is lower than the first coding rate. In this embodiment, the second SIBs include only a portion of the information included in the first SIBs. In some embodiments, the second identifier is a compressed SI-RNTI. Flow ends at 1220.

In some embodiments, base station 102 is configured to communicate with multiple UEs, e.g., a first UE that initiates communications based on the first SIBs and a second UE that initiates communication based on the second SIBs. The second UE may have a limited link budget. In some embodiments, information included in the first SIBs that is not included in the second SIBs includes one or more of: cell selection parameters, cell reselection parameters, maximum power information, spectrum emission information, radio resource configuration information, or speed information. In some embodiments, the first SIBs include one or more SIB types that are not included in the second SIBs. In some embodiments, information specified by one type of SIB in the first SIBs is specified by a second type of SIB in the second SIBs.

FIG. 13 is a flow diagram illustrating one embodiment of a method 1300 for receiving compressed SIBs. The method shown in FIG. 13 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 1310.

At 1310, UE 106 receives compressed SIBs in a broadcast transmission from a base station. In some embodiments, the compressed SIBs include less data than non-compressed SIBs that the base station is also configured to broadcast. In some embodiments, the compressed SIBs are transmitted using a lower coding rate and/or smaller transport block size relative to non-compressed SIBs that the base station is configured to broadcast. In some embodiments, UE 106 is configured to monitor for a compressed SI-RNTI in order to receive the compressed SIBs.

At 1320, UE 106 decodes the compressed SIBs. This may involve determining various information shown in FIGS. 6A-11 that is not marked through, in some embodiments.

At 1330, UE 106 initiates communication with the base station based on access parameters specified by the decoded compressed system information. Flow ends at 1330. Based on the compressed system information, the UE may decide to camp on a cell, based on a determination that the cell is suitable. Based on the compressed system information, the UE may perform cell reselection. Based on the compressed system information, the UE may perform neighbor cell detection and/or measurements.

In some embodiments, a first telecommunications standard (e.g., an LTE standard or a 5G standard) specifies contents of non-compressed SIBs. In these embodiments, the compressed SIBs do not include at least a portion of the following information specified by the telecommunications standard: cell selection parameters, cell reselection parameters, maximum power information, spectrum emission information, radio resource configuration information, or speed information.

The location of the compressed SIBs and/or their periodicity in the time domain may be similar to locations and/or periodicity of legacy SIBs, in some embodiments. For example, the compressed SIBs may use the same system frame numbers (SFN) and subframes as legacy SIBs. In other embodiments, because compressed SIBs may be indicated using a reserved RNTI, for example, the location and/or periodicity of the compressed SIBs in the time domain may be outside of the legacy SI window and may be pre-agreed or negotiated between network elements.

In some embodiments, an apparatus includes means for receiving compressed system information blocks (SIBs) in a broadcast transmission from a base station, where the base station is configured to broadcast transmissions with both compressed system information and non-compressed SIBs. In some embodiments, the apparatus further includes means for decoding the compressed SIBs from the broadcast transmission. In some embodiments, the apparatus further includes means for initiating communication with the base station based on access parameters specified by the decoded compressed system information.

In some embodiments, any of various techniques described herein may be performed based on a computer program with instructions for performing the techniques, e.g., in response to execution of the instructions. In some embodiments, a non-transitory computer-readable medium is configured to store such program instructions.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A base station, comprising:
   at least one antenna;
   at least one radio, wherein the at least one radio is configured to perform cellular communication using at least one radio access technology (RAT); and
   one or more processors coupled to the at least one radio;
   wherein the base station is configured to:
      broadcast first system information blocks (SIBs) encoded using a first coding rate and a first identifier; and
      broadcast second SIBs encoded using a second coding rate that is lower than the first coding rate and a second identifier, wherein a compressed SIB type in the second SIBs includes only a portion of the information included in the same non-compressed SIB type in the first SIBs and wherein the second SIBs are usable by a class of user equipment devices (UEs) having a limited link budget to determine access parameters for the base station.

2. The base station of claim 1, wherein the first SIBs include one or more SIB types that are not included in the second SIBs.

3. The base station of claim 1, wherein the SIB type in the first SIBs includes cell selection information and cell reselection information that is not included in the SIB type in the second SIBs.

4. The base station of claim 1, wherein the SIB type in the first SIBs includes maximum power information that is not included in the SIB type in the second SIBs.

5. The base station of claim 1, wherein the SIB type in the first SIBs include spectrum emission information that is not included in the SIB type in the second SIBs.

6. The base station of claim 1, wherein the SIB type in the first SIBs includes radio resource configuration information that is not included in the SIB type in the second SIBs.

7. The base station of claim 1, wherein the SIB type in the first SIBs includes speed information that is not included in the SIB type in the second SIBs.

8. The base station of claim 1, wherein information specified in a SIB of a first type in the first SIBs is specified by a SIB of a second type in the second SIBs.

9. The base station of claim 1, wherein the base station is further configured to:
   communicate with first and second UEs, wherein a first UE that is not in the class of UEs initiates communication based on the first SIBs and wherein a second UE that is in the class of UEs initiates communication based on the second SIBs.

10. The base station of claim 1, wherein the second identifier is a compressed system information radio network temporary identifier (SI-RNTI) indicating that the second SIBs are compressed SIBs.

11. The base station of claim 10, wherein the first SIBs are LTE SIBs, wherein the compressed SI-RNTI is a reserved RNTI, and wherein the compressed SI-RNTI specifies one or more time intervals corresponding to transmission of the compressed SIBs.

12. An apparatus, comprising:
   one or more processing elements configured to:
      decode compressed SIBs from a broadcast transmission, wherein the broadcast transmission is received from a base station that broadcasts transmissions with both compressed SIBs and non-compressed SIBs, wherein the apparatus is configured not to decode the non-compressed SIBs in at least one mode of operation, and wherein a SIB type in the compressed SIBs includes only a portion of the information included in the same SIB type in the non-compressed SIBs; and
      initiate communication with the base station, select a cell, or perform cell reselection based on access parameters specified by the decoded compressed SIBs.

13. The apparatus of claim 12, wherein the apparatus is a user equipment device (UE) that further comprises:
   at least one antenna; and
   at least one radio, wherein the at least one radio is configured to perform cellular communication using at least one radio access technology (RAT).

14. The apparatus of claim 12, wherein a first telecommunications standard specifies contents of the SIB type in the non-compressed SIBs transmitted by the base station.

15. The apparatus of claim 14, wherein the SIB type in the compressed SIBs does not include one or more threshold values for cell selection or reselection that are specified by the telecommunications standard for SIB type in the non-compressed SIBs.

16. The apparatus of claim 14, wherein the SIB type in the compressed SIBs does not include at least a portion of the following information specified by the telecommunications standard: maximum power information, spectrum emission information, radio resource configuration information, or speed information.

17. The apparatus of claim 14, wherein the compressed SIBs include information in a different SIB type than specified for non-compressed SIBs by the telecommunications standard.

18. The apparatus of claim 12, wherein the one or more processing elements are configured to determine transmissions that include the compressed SIBs based on a compressed system information radio network temporary identifier (SI-RNTI) corresponding to the compressed SIBs.

19. The apparatus of claim 12, wherein the compressed SIBs are transmitted at a coding rate that is lower than a coding rate for non-compressed SIBs transmitted by the base station.

20. The apparatus of claim 12, wherein the apparatus is configured, in response to a change in link budget, to receive non-compressed SIBs, decode the non-compressed SIBs, and initiate communication with a base station based on the decoded non-compressed SIBs.

21. A method, comprising:
   a base station broadcasting non-compressed first system information blocks (SIBs) encoded using a first coding rate and a first identifier; and
   the base station broadcasting compressed second SIBs encoded using a second coding rate that is lower than the first coding rate and a second identifier, wherein a compressed SIB type in the second SIBs includes only a portion of the information included in the same SIB type in the first SIBs and wherein the second SIBs are usable by a class of user equipment devices (UEs) having a limited link budget to determine access parameters for the base station.

22. The method of claim 21, wherein the SIB type in the first SIBs includes cell selection information and cell reselection information that is not included in the SIB type in the second SIBs.

\* \* \* \* \*